(No Model.)
J. L. REAM.
HORSESHOEING RACK.
No. 570,682.  Patented Nov. 3, 1896.
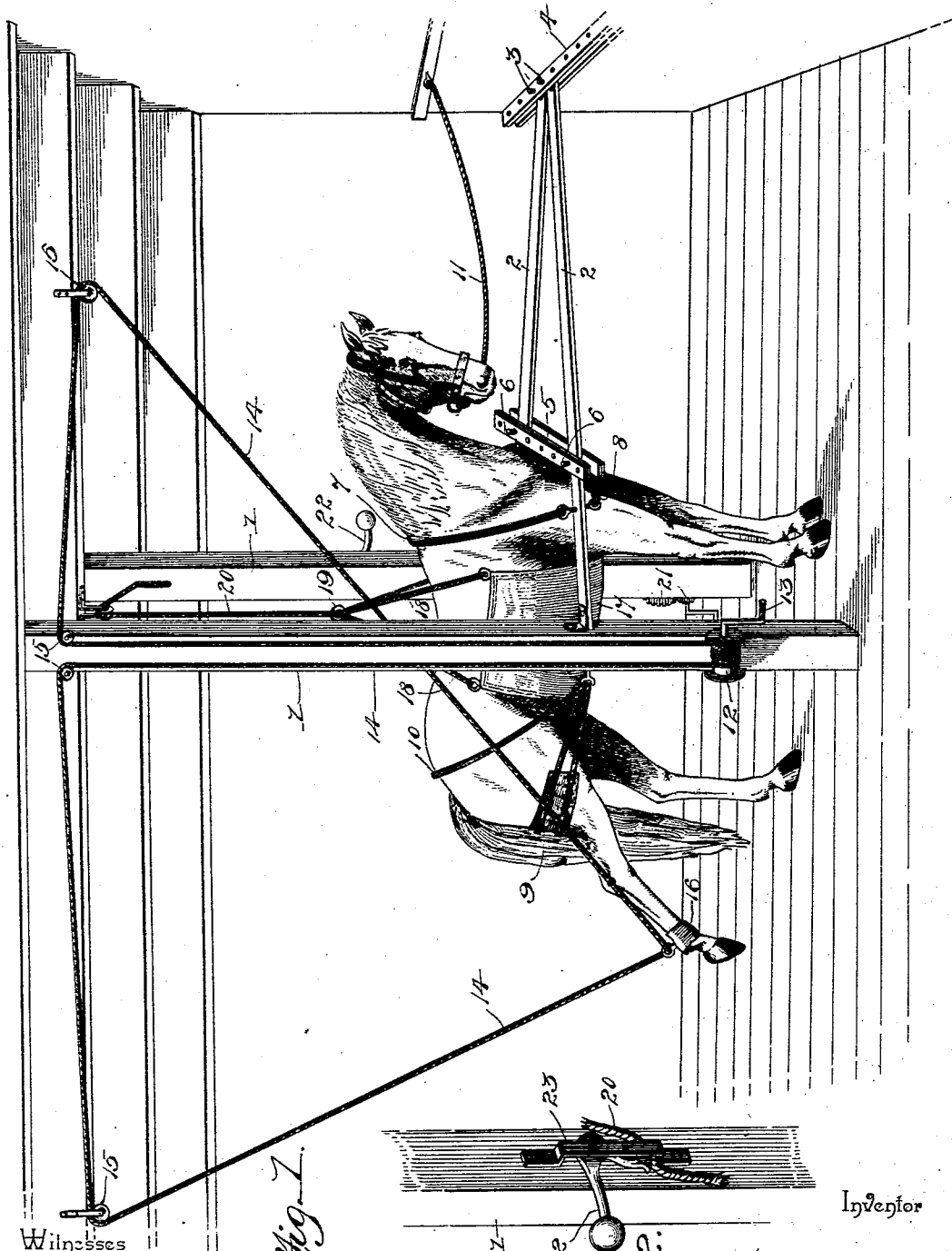

UNITED STATES PATENT OFFICE.

JOHN LYCURGUS REAM, OF AXTELL, KANSAS, ASSIGNOR OF ONE-HALF TO JAMES C. BRIGGS, OF SAME PLACE.

HORSESHOEING-RACK.

SPECIFICATION forming part of Letters Patent No. 570,682, dated November 3, 1896.

Application filed November 30, 1895. Serial No. 570,682. (No model.)

*To all whom it may concern:*

Be it known that I, JOHN LYCURGUS REAM, a citizen of the United States, residing at Axtell, in the county of Marshall and State of Kansas, have invented a new and useful Horseshoeing-Rack, of which the following is a specification.

This invention relates to an improvement in apparatus for facilitating the shoeing of vicious or unruly horses or other stock, and the object in view is to provide an improved form and construction of rack with the aid of which the animal may be confined in such manner as to prevent it from doing injury to the operator during the act of shoeing.

The principal object of the present invention is to provide simple means whereby, after the animal has been confined in the rack, the hoof may be raised either backward or forward and held suspended during the operation of shoeing.

To this end the invention consists in certain novel features and details of construction and arrangement of parts, as hereinafter fully described, illustrated in the drawings, and finally embodied in the claim.

In the accompanying drawings, Figure 1 is a perspective view illustrating the improved apparatus and its application to a horse. Fig. 2 is a detail perspective view of the rope-grip.

Similar numerals of reference designate corresponding parts in the several figures of the drawings.

Referring to the accompanying drawings, 1 designates a pair of posts or uprights, which may be extended from the floor or ground to the overhead joists or rafters, as shown in Fig. 1, the said post being spaced sufficiently apart to admit of a horse or other animal being stood between them. Pivotally connected to the front faces of the posts 1 are two forwardly-converging longitudinal thills or bars 2, the forward or convergent ends of which are slotted to receive stay-pins 3, passing through any two of a plurality of perforations in a horizontal rack 4, secured to the wall of the building or other convenient point of support. Intermediate the ends of the longitudinal thills or bars 2 is a yoke 5, consisting of a pair of cross-bars arranged in parallelism and upon opposite sides of or above and beneath the longitudinal bars 2. These bars are formed with corresponding series of vertically-alining holes through which may be passed pins 6, passing also through the bars 2. By this construction the space between the longitudinal bars may be varied to suit the animal operated upon, and at the same time the yoke 5 arrests the forward movement of the animal. A strap 7 connects at its ends to the longitudinal bars 2 and passes over the neck of the animal for preventing the animal from rearing, and an additional strap 8, connected to the bars 2 in the same manner, may pass across the breast of the horse for assisting in arresting the forward movement.

The backing of the animal is prevented by means of a breeching strap or band 9, which is connected at its ends by means of screw-eyes or other suitable fastenings to the posts or uprights 1, while an additional strap 10 is passed upward over the back of the animal to prevent kicking. A tethering strap or rope 11 also assists in preventing the backing of the animal.

12 designates a windlass journaled on one of the posts or uprights 1 at a suitable height and within easy access of the operator and having an operating-crank 13. From this windlass a rope 14 extends upward over suitable pulleys 15, attached to the upper portion of said posts and the overhead joists or rafters, and thence downward to form a pendent loop, where it connects with and supports a shackle or fetter 16, adapted to surround and be engaged with the ankle of the animal to be shod. The rope 14 is endless or continuous, running off one side of the windlass while running upon the opposite side, and has a fixed connection with the shackle or fetter 16. The shackle or fetter is engaged around a horse's ankle while the hoof is resting upon the ground, and thereafter the windlass may be turned in either direction, according as to whether it is desired to raise the foot of the animal backward or forward.

17 indicates a sling in the form of a broad flexible band passing beneath the body of the animal and having connected to its corners suspending-ropes 18, which converge upwardly to a common ring or eye 19 at the end of a hoisting-rope 20. This rope 20 passes upward over suitable overhead pulleys and downward alongside of one of the posts or uprights 1, where it connects with and is adapted to be wound upon a windlass similar to that, 12, above referred to, but actuated by suitable power-gearing 21. By these means the animal may be raised slightly or sufficiently to remove a material portion of his weight from the floor or ground, so as to incapacitate the animal for any sudden or violent movement. The hoisting-rope 20 is held against slipping by means of a weighted rope-grip 22, journaled in a bracket 23, secured to the post or upright 1, as shown in Fig. 2. The rope 20 passes through the bracket 23 and is confined between the same and a toothed or serrated part of the rope-grip, being thereby held against slipping.

By means of the construction above described it will be seen that a very simple and efficient rack is provided which will successfully resist any movement of the animal confined therein, thus materially facilitating the operation of shoeing. At the same time the said rack is adjustable to animals of different sizes, and by the simple arrangement of the adjusting-windlass 12 and the manner of reeving the rope 14 through the overhead pulleys and attaching the same to the shackle or fetter it is possible to elevate the hoof of the horse either forward or backward by simply reversing the direction of rotation of the windlass, the horse's hoof being held suspended without additional contrivances in either of such positions.

Changes in the form, proportion, and minor details of construction may be resorted to without departing from the spirit or sacrificing any of the advantages of this invention.

Having thus described the invention, what is claimed as new is—

In an apparatus for shoeing horses, the combination with uprights and connected means for preventing movement of the body of an engaged horse, of a windlass, an endless cable wound at an intermediate point upon the windlass, overhead pulleys through which the ends of the cable are reeved to extend in opposite directions, said cable depending to form a loop between the outermost pulleys, and a shackle or fetter rigidly secured to said looped portion of the cable for engagement with the leg of a horse, whereby the leg may be elevated either forwardly or rearwardly by turning the windlass in opposite directions, substantially as specified.

In testimony that I claim the foregoing as my own I have hereto affixed my signature in the presence of two witnesses.

JOHN LYCURGUS REAM.

Witnesses:
JAMES C. BRIGGS,
D. R. POMEROY.